Dec. 23, 1969     W. A. MOORE ET AL     3,485,475
SPHERICAL ROTARY VALVE

Filed Jan. 21, 1964     3 Sheets-Sheet 1

INVENTORS
WILLIAM A. MOORE
ARTHUR GROSS
EDWARD C. SKEI

BY Lyon & Lyon

ATTORNEYS

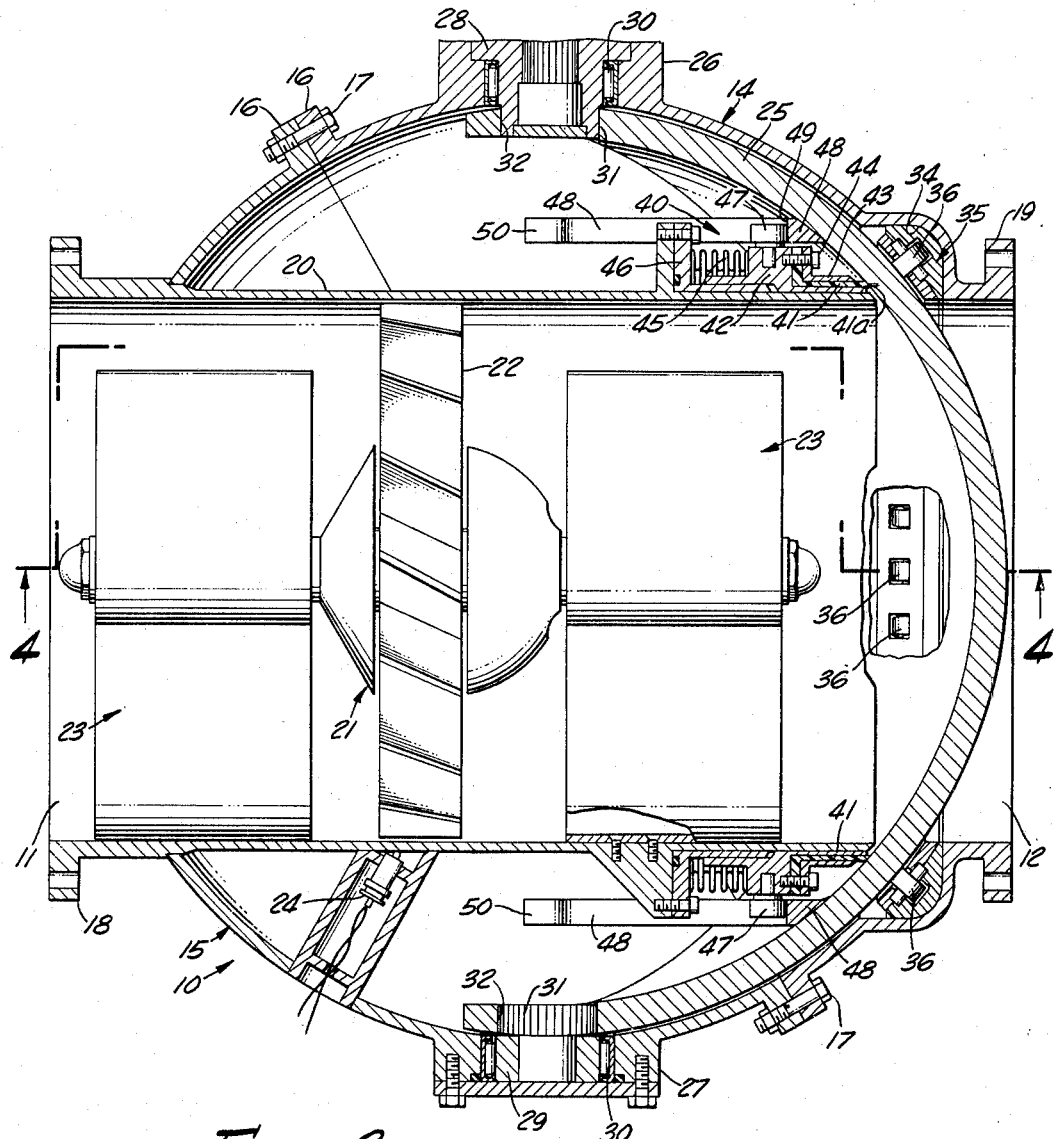

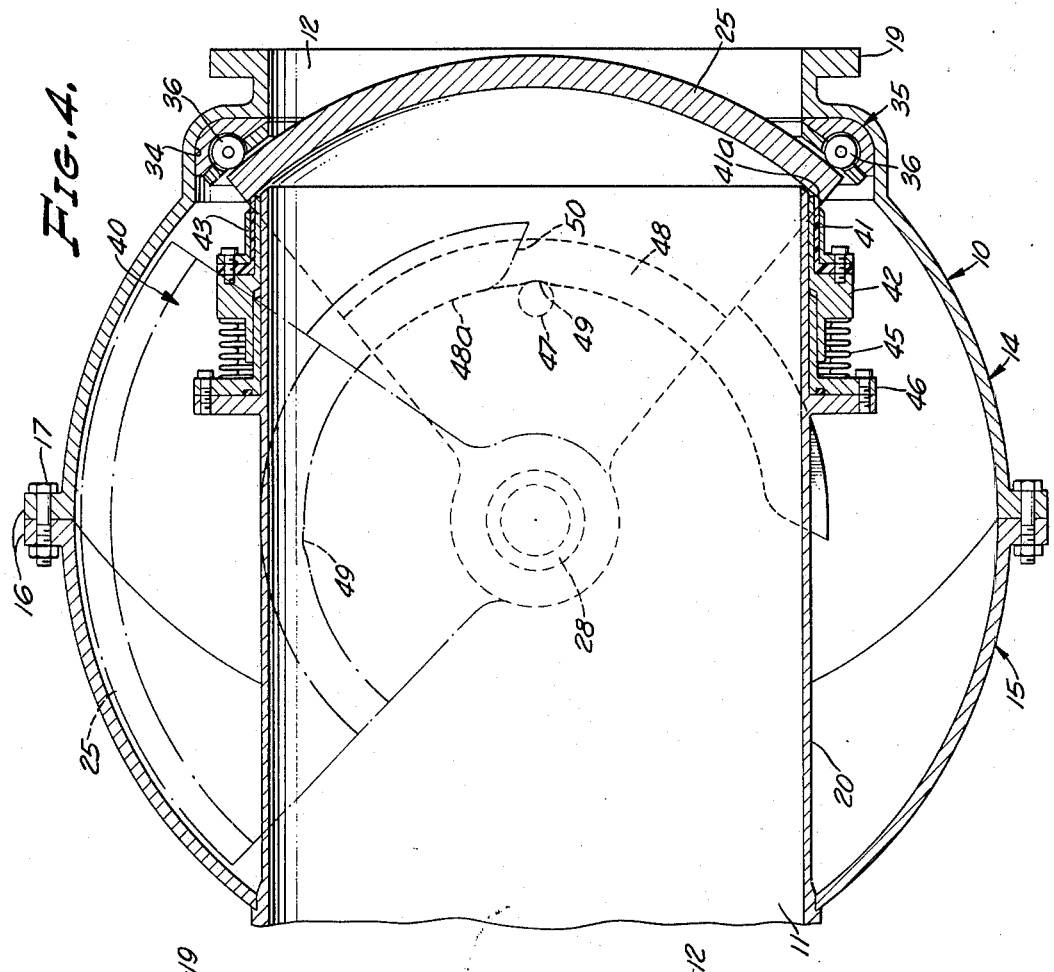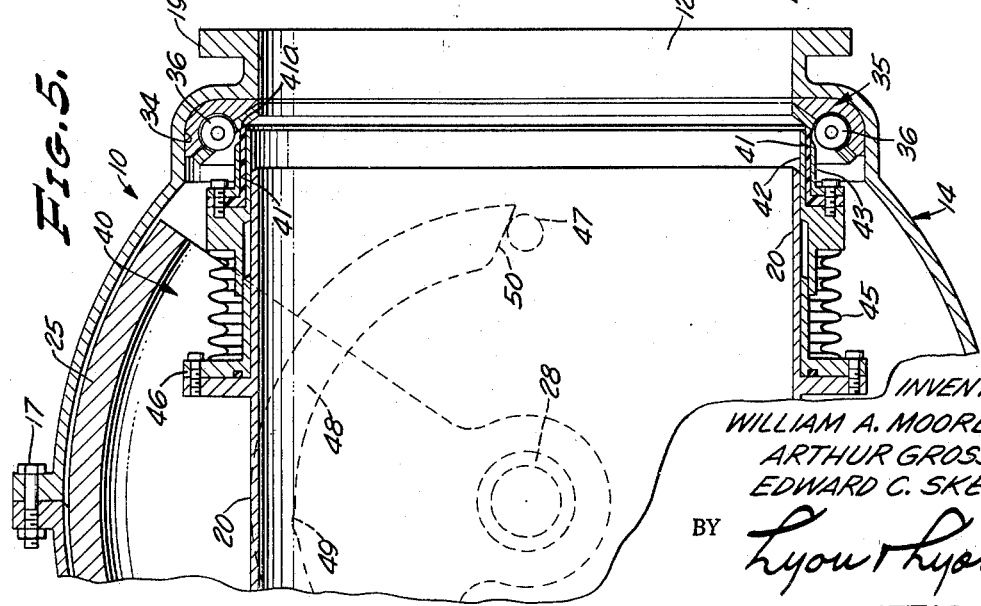

United States Patent Office 3,485,475
Patented Dec. 23, 1969

3,485,475
SPHERICAL ROTARY VALVE
William A. Moore, Los Angeles, Arthur Gross, Granada Hills, and Edward C. Skei, Thousand Oaks, Calif., assignors to Whittaker Corporation, Los Angeles, Calif., a corporation of California
Filed Jan. 21, 1964, Ser. No. 339,175
Int. Cl. F16k 25/00
U.S. Cl. 251—159       7 Claims This invention relates to a valve in which the closure member rotates between open and closed positions and, in particular, relates to a valve of this type having a relatively large diameter passageway therethrough and yet being of extremely light weight.

There are a number of practical applications requiring a fluid valve having a large diameter passageway capable of handling large volumes of fluid at moderate pressures and capable of forming a perfectly fluid-tight seal in the closed position. Further, certain of such applications require that the fluid valve be relatively easy to actuate between the open and closed positions and that the entire valve be extremely lightweight. One of such situations is the valve requirement of the fuel and liquid oxygen prevalves associated with missiles and rockets. For example, in relation to one program a valve is required to have a seventeen inch diameter flow passageway for handling approximately 25,000 gallons per minute of liquid at normal pressures of 185 pounds per square inch and yet the valve must be lightweight.

While numerous styles of valve construction may be employed for producing a valve of the proper size and having the desired sealing characteristics, the heretofore conventional valves were extremely heavy and required excessive forces to accomplish the opening and closing. One of the previously conventional approaches to constructing a valve having the desired characteristics was to provide a spherical valve housing with a sealing element adapted to seal around the inlet or outlet opening of the housing and to rotatably mount the sealing element by diametrically positioned trunnions supported by the housing. However, due to this trunnion support, the sealing element and the housing both had to be of higher structural strength to avoid the effects of distortion, etc., than would appear to be required by the mere internal fluid pressures to be encountered. That is to say, for example, the spherical housing had a wall thickness of a magnitude far greater than the required wall thickness of a simple spherical vessel of the same size and capable of retaining the same internal pressure.

Therefore, it is a principal object of this invention to provide a novel form of spherical rotary valve wherein the spherical closure member is substantially supported in the closed position by antifriction means surrounding and adjacent to the outlet flange of the valve for distributing such load to such flange.

Another object of this invention is to provide a spherical rotary valve having a novel gate or visor closure member which is pivotally mounted in diametrically spaced trunnions to only loosely support the closure member and a plurality of antifriction rollers are mounted downstream of the closure member for engaging and structurally supporting the closure member in the closed position and during movement toward the open position.

A further object of this invention is to provide a novel spherical rotary valve wherein the fluid seal is accomplished by a resilient sealing element engaging the upstream concave side of the closure member and cooperating with a tubular member extending from the inlet of the valve to such seal. A still further object is to provide such a valve arrangement wherein the resilient sealing element is mechanically retracted from sealing engagement during the first movement of the closure means from the closed position toward the open position and throughout the remainder of the movement of the closure member.

Still another object of this invention is to provide a novel form of spherical rotary valve wherein the fluid seal is accomplished on the pressure side of the spherical closure member and the closure member is mechanically supported by antifriction means on the other side at locations positioned substantially directly through the closure member from such seal for minimizing the effects of pressure distortion.

Other and more detailed objects and advantages of this invention will appear from the following description and the accompanying drawings, wherein:

FIGURE 3 is a sectional elevation view taken substantially on the line 3—3 shown in FIGURE 1 with portions broken away for clarity of illustration.

FIGURE 4 is a sectional plan view taken from the bottom substantially on the line 4—4 shown in FIGURE 3 and with solid lines illustrating the valve closure member in closed position and with phantom lines indicating the closure member in open position.

FIGURE 5 is a fragmentary view similar to FIGURE 4 illustrating the valve closure member in the open position with the valve sealing means extended to minimize fluid turbulence.

Figure 1:
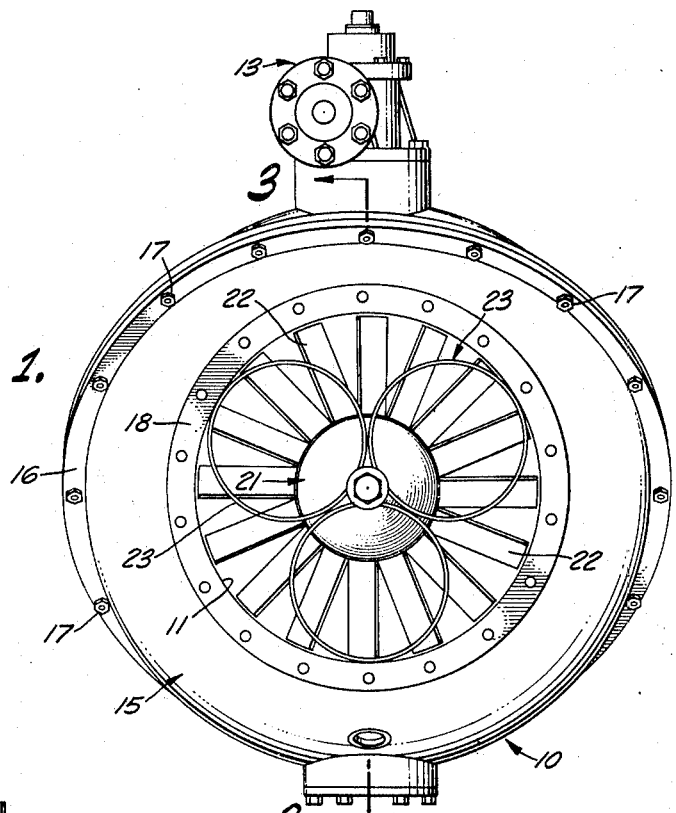
FIGURE 1 is an elevation view of the valve of this invention as viewed in an axial direction from the inlet side.
Figure 2:
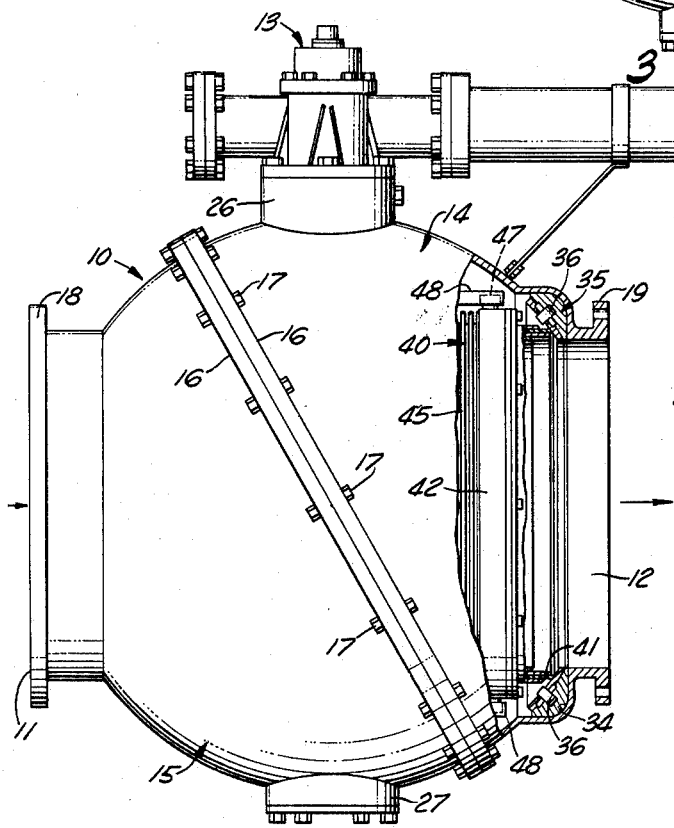
FIGURE 2 is a side elevation of the valve of this invention with portions broken away to show details with the valve in the open position.

The valve of this invention includes a spherical housing 10 having axially aligned inlet 11 and outlet 12 openings and having an actuator, generally designated 13. For construction and assembly purposes, although it is not essential to this invention, it is preferred that the spherical housing 10 be comprised of two hemispherical members 14 and 15 joined along a plane positioned approximately 60° from the axial alignment of inlet 11 and outlet 12. Flanges 16 and fastening means 17 are provided for connecting the two hemispherical members 14 and 15. The inlet 11 is provided with a flange 18 and the outlet 12 is provided with a flange 19 both for connecting to a pipe, conduit, or the like that conducts the fluid to and from, respectively, the valve. The flange 18 on the inlet may be joined to a tubular member 20 which is axially aligned with the inlet and outlet and extends a major portion of the distance toward the outlet 12.

Although it is not essential to this invention, a flow meter, generally designated 21, may conveniently be mounted within the tubular member 20 for determining the rate of fluid flow through the valve. As is conventional, the flow member 21 may include a turbine blade assembly 22 rotatably supported by any convenient and non-obstructing means such as three annular members 23 on either side of the blade assembly which also serve to maintain the axial direction of fluid flow. An appropriate magnetic pickup assembly 24 is installed within the spherical housing 10, outside of the tubular member 20, and opposite the blade assembly 22 for "reading" the rate of rotation of the blade assembly to determine flow rate as is well known to those skilled in the art.

A closure means is provided in the valve of this invention for movement between open and closed positions to allow or prevent, respectively, fluid flow through the valve, and as shown in the drawings this closure means is comprised of a gate or visor 25 in the form of a spherical segment having an outer surface of a diameter substantially equal to the inside diameter of the spherical housing 10. The visor 25 is closely spaced from the interior surface of the spherical housing 10 and in the closed position, the visor is between the free end of tubular member 20 and the outlet 12. The housing 10 is provided with a pair of diametrically spaced mounting bosses 26 and 27 located in alignment with an axis perpendicular to and passing through the common axis of tubular member 20, inlet 11 and outlet 12. A pair of stub shafts 28 and 29 are rotatably mounted in bosses 26 and 27, respectively, by any appropriate means such as roller bearings 30. Stub shafts 28 and 29 are provided with splines 31 for mating with internal splines 32 provided at diametrically spaced locations on the visor 25. In this manner the visor 25 is pivotally supported within the housing 10 for movement about the diametric axis perpendicular to and passing through the common axis of inlet 11, outlet 12, and tubular member 20. The spline connection between visor 25 and the stub shafts 28 and 29 is purposely loose for permitting relative movement, whereby, for example, distortion of housing 10 due to flund pressure changes is not resisted or encouraged by the visor 25 and does not tend to distort visor 25. Actuator 13 may be of any conventional mechanical, electrical, pneumatic, or hydraulic construction for causing rotary movement and the construction of the actuator assembly forms no portion of this invention. The actuator assembly 13 is connected to stub shaft 28 for causing rotary movement of stub shaft 28 as desired for pivoting visor 25 between the closed position shown in solid lines in FIGURE 4 and the open position shown by phantom lines in FIGURE 4.

The portion of housing 11 immediately adjacent the flange 19 on outlet 12 is formed with a recess 34 surrounding the outlet. A ring assembly, generally designated 35, for supporting appropriate antifriction means adapted to engage the exterior surface of visor 25 is mounted in the recess 34. The antifriction means may include a plurality of rollers 36 rotatably mounted in the ring assembly 35 for engaging the outer surface of visor 25. The rollers 36 are distributed throughout the circumference of ring assembly 35 in an appropriate manner to accomplish the hereafter described desired functions. Each of the rollers is properly oriented for making rolling contact with the outer surface of visor 25 such as to offer the minimum resistance to the pivotal movement of visor 25 between the open and closed positions. The number and placement of the rollers 36 may be widely varied for meeting the requirements of any particular installation but, by way of example only, it has been found that for a valve of the type previously described having a seventeen inch diameter inlet and outlet a pattern of thirty-six rollers 36 evenly spaced in ring assembly 35 is satisfactory. The rollers 36 therefore form a circular pattern of contact with the outer surface of visor 25 in the closed position. As will appear hereinafter, the upstream fluid pressure is applied directly to the inner concave surface of the visor 25 when the visor is in the closed position, thereby urging the visor 25 in an outward and downstream direction and this force on the visor is resisted and supported by the rollers 36. The rollers 36 are in turn supported by the ring assembly 35 which is in turn supported by the flange 19 that is connected to a similar flange, thereby producing a substantially rigid support for rollers 36 and the visor 25 in the closed position. Moreover, when the visor 25 is moved from the fluid pressured closed position toward the open position by the actuator 13, the visor is supported by the rollers 36 which due to their rolling contact with the surface of visor 25 offer a very minimum of resistance to the visor movement. This, of course, permits the use of an actuator assembly 13 of relatively low torque output as compared to the torque output required to pivot the gate members of previously conventional rotary valves. Moreover, by minimizing this torque that is needed for rotating the visor, the structural strength of the components for transmitting this torque is minimized to in turn permit reduction in the size, thickness and weight of such components.

Means are provided for producing a seal between tubular member 20 and the inner surface of visor 25 and, as shown in the drawings, these means may include a seal assembly, generally designated 40, mounted on the exterior of the end of tubular member 20 near outlet 12. Seal assembly 40 includes an annular resilient sealing member 41 appropriately mounted on an annular collar 42 by means of a flange 43 and fasteners 44 with the front edge 41a of the sealing member extending into engagement with the inner surface of the visor 25. The sealing member 41 may be of any convenient material such as Teflon. A machined aluminum bellows 45, or similar device, surrounds tubular member 20 and extends between collar 42 and a fixed supporting flange 46. The bellows 45 mechanically urge the assembly of collar 42, flange 43 and sealing member 41 in a forward direction toward engagement with the visor 25. It is also to be noted that any internal fluid pressure on bellows 45 as by fluid communication with the interior of tubular member 20 also urges the assembly in the forward direction to further insure a tight seal at edge 41a in response to increased fluid pressures.

In order to avoid excessive wear and damage to the engaging edge 41a of the sealing member 41, a pair of interengaging cam rollers 47 and cam tracks 48 are provided on the seal assembly 40 and the visor 25, respectively, above and below the tubular member 20. The two cam rollers 47 are mounted on the movable annular collar 42. The two cam tracks 48 are mounted on the inner surface of visor 25, extend in a circular direction relative to the axis of shafts 28 and 29, and actually extend beyond the extremity of the visor as is readily apparent in FIGURES 4 and 5. The major portion of the inner cam surface of the cam tracks 48 are substantially circular and concentric with the axis of the stub shafts 28 and 29, but a depressed portion or detent 49 is located opposite the rollers 47 at the closed position of the visor 25. As heretofore described, with the visor 25 in a closed position the edge 41a of the sealing member 41 is in engagement with the inner surface of visor 25 and this is permitted by reason of the cam rollers 47 being located opposite the detent portions 49 of the cam tracks to permit the entire seal assembly 40 to be urged in the forward direction without obstruction by the interengagement of cam rollers 47 and cam tracks 48. As the visor 25 is pivoted toward the open position, the cam rollers 47 ride up onto the major cam surface 48a of the cam tracks which is of a smaller radial dimension than the detent portion 49, thereby causing the seal assembly 40 to be moved axially away from the visor 25, thereby retracting the seal member 41 for engagement with the inner surface of the visor. This retraction occurs in the first few degrees of movement of the visor and thus the amount of sliding movement between the seal member 41 and the inner surface of the visor is minimized. The seal member 41 is retained in the retracted position until the trailing edge of the visor clears the seal member and then, although it is not essential to this invention, the seal assembly 40 may be allowed to move forward into engagement with the ring assembly 35 as shown in FIGURE 5. This movement is accomplished by providing an outwardly extending ramp portion 50 on the cam track 48 for permitting the cam rollers 47 to move forward as the trailing edge of the visor 25 clears the seal assembly 40. With the seal assembly 40 extended into engagement with the ring assembly 35, the wall of the fluid passageway through this area of the valve is relatively smooth as compared to merely retaining the seal assembly in the retracted position. This may be desirable in certain situations such as under high fluid velocity conditions where substantial turbulence would be caused by leaving an open gap between the end of tubular member 20 and the outlet 12. Movement of the visor 25 from the open position toward the closed position causes the cam rollers 47 to ride inwardly up the cam ramp 50 to thereby retract the seal assembly 40 and permit the visor to again be positioned between the tubular member 20 and the outlet 12. As the detent portion 49 of the cam track 48 reaches the cam rollers 47, the seal assembly is again permitted to move forward for establishing sealing engagement between the sealing member 41 and the inner surface of the visor 25. It is to be noted that the sealing member 41 engages the inner surface of visor 25 in a circular pattern directly opposite the circular pattern of support formed by the rollers 36 and therefore the internal fluid pressure on the visor 25 is completely restricted to this periphery supported circular segment of the visor which minimizes the distortion of the visor due to internal pressure.

We claim:

1. In a valve comprising a spherical housing having an inlet and a diametrically aligned outlet, a spherical segment closure means movably mounted in said housing for pivotal movement between positions closing and opening communication between said inlet and outlet, a tubular member extending from said inlet toward and proximate to said outlet, a seal means for sealing between said tubular member and said closure means in the closed position, means for extending said seal means to engage and seal with said outlet in the open position of said closure means, and a plurality of rollers mounted in said housing surrounding said outlet and engaging said closure means for supporting said closure means in the closed position and each said roller having its axes separately oriented with respect to the surface of said closure means at the location of that roller for rolling support of said closure means during movement toward the open position.

2. In a valve comprising a spherical housing having an inlet and a diametrically aligned outlet, a spherical segment closure means movably mounted in said housing for pivotal movement between positions closing and opening communication between said inlet and outlet, tubular means for extending from said inlet and engaging said closure means in sealing relation in the closed position, means for retracting the sealing engagement of said tubular means upon beginning movement of said closure means toward the open position and for extending said tubular means into sealing engagement with said outlet in the open position of said closure means, and anti-friction means positioned between said closure means and said outlet for supporting said closure means in the closed position and during movement from the closed position toward the open position.

3. In a lightweight valve for connection in series with a larger diameter conduit, the combination of: a spherical housing having aligned diametrically positioned inlet and outlet openings for communicating with said conduit, a flange means surrounding said outlet opening and joined to said housing for connecting to such conduit, a visor in the form of a hollow spherical segment just smaller in diameter than said housing for positioning therein and having a width larger than said outlet opening, bearing means for pivotally mounting diametrically spaced portions of said visor on said housing for movement about an axis perpendicular to the center line of said aligned inlet and outlet openings to close or open said outlet opening, a plurality of rollers rotatably mounted and oriented in said housing immediately adjacent said flange means and oriented on separate axes surrounding said outlet opening for making anti-friction rolling contact with the outer surface of said visor during movement of said visor between open and closed positions and for supporting said visor in the closed position against the internal pressures in the valve, and means extending from said inlet opening toward and proximate to said outlet opening for sealably engaging the inner surface of said visor in the closed position and for projecting into sealing engagement with said outlet in the open position of said visor.

4. In a lightweight valve for connection in series with a large diameter conduit, the combination of: a spherical housing having aligned diametrically positioned inlet and outlet openings for communicating with such conduit, a flange means surrounding said outlet opening and joined to said housing for connecting to such conduit, a visor in the form of a hollow spherical segment just smaller in diameter than said housing for positioning therein and having a width larger than said outlet opening, bearing means for pivotally mounting said visor in said housing for movement between open and closed positions relative to said outlet opening, anti-friction means mounted in said housing immediately adjacent said flange means surrounding said outlet opening for supporting said visor during movement of said visor between open and closed positions and for supporting said visor in the closed position against the internal pressures in the valve, a seal assembly means in said housing and extending from the inlet opening toward and proximate to the outlet opening for engaging the inner surface of said visor in the closed position in sealing relation to seal the inlet opening to the inner surface of the visor, said seal assembly including an annular resilient sealing means for engaging the visor inner surface and means for supporting said sealing means for axial movement toward and away from said outlet opening, and means for extending said resilient sealing means into sealing engagement with said outlet in the opening position of said visor and for causing retraction of said sealing means from engagement with said visor upon and during the movement of said visor between said closed and said open positions.

5. In a lightweight valve for connection in series with a large diameter conduit, the combination of: a spherical housing having an internal diameter larger than the internal diameter of such conduit, said housing having aligned diametrically positioned inlet and outlet openings for communicating with such conduit, a flange means surrounding said outlet opening and joined to said housing for connecting to such conduit, a visor in the form of a hollow spherical segment just smaller in diameter than said housing for positioning therein and having a width larger than said outlet opening, bearing means for pivotally mounting diametrically spaced portions of said visor on said housing for movement about an axis perpendicular to the center line of said aligned inlet and outlet openings, said visor movable between a closed position covering said outlet opening and an open position to the side of said housing to expose both the inlet and outlet openings, a plurality of rollers rotatably mounted in said housing immediately adjacent said flange means and the axes of said rollers separately oriented surrounding said outlet opening for making anti-friction rolling contact with the outer surface of said visor during movement of said visor between open and closed positions and for supporting said visor in the closed position against the internal pressures in the valve, a tubular member equal in diameter to said inlet and outlet openings mounted in said housing and extending from said inlet opening toward said outlet opening in alignment with said openings, said tubular member having the one end terminate a distance from said outlet opening just greater than the thickness of said visor, a seal assembly mounted on said one end of said tubular member for engaging the inner surface of said visor in the closed position in sealing relation to seal the inlet opening through the tubular member to the inner surface of the visor, said seal assembly including an annular resilient sealing means for engaging the visor inner surface and means for supporting said sealing means for axial movement toward and away from said outlet opening, means for continually urging said supporting means toward said outlet opening and the sealing means into engagement with said visor, and inter-engaging cam means on said visor and said supporting means of said seal assembly for causing retraction of said sealing means from engagement with said visor upon and throughout the movement of said visor from said closed position to said open position and for causing extension of said sealing means into engagement with said outlet opening in the open position of said visor.

6. In a lightweight valve for connection in series with a large diameter conduit, the combination of: a spherical housing having an internal diameter larger than the internal diameter of such conduit, said housing having aligned diametrically positioned inlet and outlet openings for communicating with such conduit, a flange means surrounding said outlet opening and joined to said housing for connecting to such conduit, a visor in the form of a hollow spherical segment just smaller in diameter than said housing for positioning therein and having a width larger than said outlet opening, bearing means for pivotally mounting diametrically spaced portions of said visor on said housing for movement about an axis perpendicular to the center line of said aligned inlet and outlet openings, said visor movable between a closed position covering said outlet opening and an open position to the side of said housing to expose both the inlet and outlet openings, a plurality of rollers rotatably mounted in said housing immediately adjacent said flange means and surrounding said outlet opening with the axes of each said roller separately oriented parallel to a tangent to the visor surface at the location of that roller for making anti-friction rolling contact with the outer surface of said visor during movement of said visor between open and closed positions and for supporting said visor in the closed position against the internal pressures in the valve, a tubular member equal in diameter to said inlet and outlet openings mounted in said housing and extending from said inlet opening toward said outlet opening in alignment with said openings, said tubular member having the one end terminate a distance from said outlet opening just greater than the thickness of said visor, a seal assembly mounted on said one end of said tubular member for engaging the inner surface of said visor in the closed position in sealing relation to seal the inlet opening through the tubular member to the inner surface of the visor, said seal assembly including an annular resilient sealing means for engaging the visor inner surface and means for supporting said sealing means for axial movement toward and away from said outlet opening, said annular sealing means engaging said visor immediately opposite the engagement of said plurality of rollers on the outer surface of said visor, means for continually urging said supporting means toward said outlet opening and the sealing means into engagement with said visor, and interengaging cam means on said visor and said supporting means of said seal assembly for causing retraction of said sealing means from engagement with said visor upon and throughout the movement of said visor from said closed position to said open positions and for causing extension of said sealing means into engagement with said outlet opening in the open position of said visor.

7. In a lightweight valve for connection in series with a large diameter conduit, the combination of: a spherical housing having an internal diameter larger than the internal diameter of such conduit, said housing having aligned diametrically positioned inlet and outlet openings for communicating with such conduit, a flange means surrounding said outlet opening and joined to said housing for connecting to such conduit, a visor in the form of a hollow spherical segment just smaller in diameter than said housing for positioning therein and having a width larger than said outlet opening, bearing means for pivotally mounting diametrically spaced portions of said visor on said housing for movement about an axis perpendicular to the center line of said aligned inlet and outlet openings, actuator means mounted externally of said housing and having means for engaging one of said pivotally mounted portions of said visor for selectively causing movement of said visor between a closed position covering said outlet opening and an open position to the side of said housing to expose both the inlet and outlet openings, a plurality of rollers rotatably mounted and oriented in said housing immediately adjacent said flange means and surrounding said outlet opening with the axis of each said roller oriented parallel to a tangent to the surface of said visor for each roller to make anti-friction rolling contact with the outer surface of said visor during movement of said visor between open and closed positions and for supporting said visor in the closed position against the internal pressures in the valve, a tubular member equal in diameter to said inlet and outlet openings mounted in said housing and extending from said inlet opening toward said outlet opening in alignment with said openings, said tubular member having the one end terminate a distance from said outlet opening just greater than the thickness of said visor, a seal assembly mounted on said one end of said tubular member for engaging the inner surface of said visor in the closed position in sealing relation to seal the inlet opening through the tubular member to the inner surface of the visor, said seal assembly including an annular resilient sealing means for engaging the visor inner surface and means for supporting said sealing means for axial movement toward and away from said outlet opening, means for continually urging said supporting means toward said outlet opening and the sealing means into engagement with said visor, and interengaging cam means on said visor and said supporting means of said seal assembly for causing retraction of said sealing means from engagement with said visor upon and throughout the movement of said visor from said closed position to said open position and for extending said sealing means into engagement with said outlet opening when the visor is in the open position, said interengaging cam means including a pair of arcuate cam tracks mounted on said visor at diametrically spaced locations in the direction of said pivotal mounting of the visor and a pair of diametrically positioned cam followers mounted on said sealing means for engaging said cam tracks and causing said retracted and extending movement of said sealing means.

References Cited

UNITED STATES PATENTS

| | | | |
|---|---|---|---|
| 1,779,637 | 10/1930 | Phillips | 251—203 X |
| 1,829,069 | 10/1931 | Standlee | 251—203 X |
| 2,263,617 | 11/1941 | Daniel | 251—193 |
| 2,809,011 | 10/1957 | Davis | 251—175 X |
| 2,883,147 | 4/1959 | Mirza | 251—159 X |
| 3,123,334 | 3/1964 | Hitz | 251—163 X |

FOREIGN PATENTS

| | | |
|---|---|---|
| 626,706 | 5/1927 | France. |
| 587,382 | 4/1947 | Great Britain. |
| 268,772 | 9/1950 | Switzerland. |

HAROLD W. WEAKLEY, Primary Examiner

U.S. Cl. X.R.

251—170, 188, 203